US011193626B2

(12) United States Patent
Stafford (10) Patent No.: US 11,193,626 B2
(45) Date of Patent: Dec. 7, 2021

(54) FUNNEL HOLDER AND METHOD

(71) Applicant: Brent Lawrence Stafford, Sandpoint, ID (US)

(72) Inventor: Brent Lawrence Stafford, Sandpoint, ID (US)

( * ) Notice: Subject to any disclaimer, the term of this patent is extended or adjusted under 35 U.S.C. 154(b) by 0 days.

(21) Appl. No.: 16/782,048

(22) Filed: Feb. 4, 2020

(65) Prior Publication Data

US 2020/0248861 A1 Aug. 6, 2020

Related U.S. Application Data

(60) Provisional application No. 62/918,531, filed on Feb. 4, 2019.

(51) Int. Cl.
| | | |
|---|---|---|
| F16M 11/12 | (2006.01) | |
| F16M 11/04 | (2006.01) | |
| B01L 9/00 | (2006.01) | |
| B67C 11/00 | (2006.01) | |

(52) U.S. Cl.
CPC .............. *F16M 11/126* (2013.01); *B01L 9/00* (2013.01); *F16M 11/041* (2013.01); *F16M 11/048* (2013.01); *B67C 11/00* (2013.01); *F16M 2200/065* (2013.01); *F16M 2200/08* (2013.01)

(58) Field of Classification Search
CPC ...... B67C 11/00; B67C 2011/027; B01L 9/00; F16M 11/048; F16M 11/126; F16M 2200/065
USPC ...................................................... 248/125.8
See application file for complete search history.

(56) References Cited

U.S. PATENT DOCUMENTS

| | | | | |
|---|---|---|---|---|
| 268,239 | A * | 11/1882 | Johnson | A47J 43/22 248/94 |
| 1,820,305 | A * | 8/1931 | Farmer | B01L 9/02 422/566 |
| 2,324,655 | A * | 7/1943 | Tozer | B67C 11/00 248/94 |
| D341,520 | S * | 11/1993 | LaBelle | D15/199 |
| 5,799,849 | A * | 9/1998 | Beer | B60R 11/00 224/282 |
| 6,390,424 | B1 * | 5/2002 | Kidushim | A45D 20/12 248/122.1 |

(Continued)

FOREIGN PATENT DOCUMENTS

| | | |
|---|---|---|
| WO | WO2014183878 | 11/2014 |
| WO | WO201763279 | 4/2017 |

*Primary Examiner* — Bradley Duckworth
(74) *Attorney, Agent, or Firm* — John D. Long, Esq.; Long & Chybik (57) ABSTRACT

The invention is an articulated funnel holder and a method, the articulated funnel holder comprising a magnetic tray supporting a J-shaped support arm that attaches at one end to the magnetic tray and at another end to a pivoting device, the pivoting device further connects to one mast end of telescopic mast to move the telescopic mast between raised and lowered positions relative to the magnetic tray, a remaining mast end removably supports a funnel ring that removably receives and supports a funnel, wherein the articulated funnel holder moves between an open operative position and compact storage position; wherein articulated funnel holder in the compact storage position places the telescopic mast and the one or more funnel rings within a storage area as defined by edges of the magnetic tray.

14 Claims, 5 Drawing Sheets

(56) References Cited

U.S. PATENT DOCUMENTS

| | | | |
|---|---|---|---|
| 6,739,936 B1* | 5/2004 | Cotilletta | A63H 3/50 |
| | | | 248/125.8 |
| 9,242,368 B2* | 1/2016 | Huang | B25H 5/00 |
| 9,440,485 B2* | 9/2016 | Krusoe | B44D 3/126 |
| 2002/0020797 A1* | 2/2002 | Artz | A47G 23/0225 |
| | | | 248/424 |
| 2012/0097809 A1* | 4/2012 | Carlson | B67C 11/00 |
| | | | 248/125.8 |

* cited by examiner

FUNNEL HOLDER AND METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may relate to funnel holders. More specifically, the present invention may relate to articulated funnel holders that may move between a compact storage position and an open operative position.

BACKGROUND

Funnels may be seen as useful devices to direct liquids and small particulate matter through small openings of containers, receiving instrumentalities and such (e.g., a motor oil being placed into an internal combustion engine or ICE). Very generally, funnels may be seen as devices forming a channel having two open channel ends that may continuously connect an exterior of the funnel to an interior of the funnel to substantially guide material, liquids and such into respective interiors of receiving devices, containers and alike. One channel end (substantially used to receive liquids and other matter) may have an opening diameter significantly larger than an opening diameter of other channel end (though which materials, liquids or both may be directed into an interior of a container, receiving device or like.) During funnel operations, a person may hold the funnel with one hand in the place while using the remaining hand to tilt a container to pour the container's contents into the funnel. An issue may arise if the person's aim, manual dexterity or both is generally not good enough to maneuver an opening lip of the container containing pourable material or contents into close proximity or direct contact with the funnel resulting in spillage of the container's contents outside of the held funnel.

Another issue could arise once the said funnel pouring is substantially accomplished and residual material that may coat some or all of the funnel interior. If the funnel is just placed on a flat surface, then the material residue can leak out and create a mess upon the flat surface. If the funnel is left in contact with the receiving instrumentality to further drain out the residue then possible contaminates (e.g., dust, dirt and alike) may also enter the receiving instrumentality's interior. Wiping down the funnel interior may require disposal of the wiping materials (e.g., paper or rag towels). Rising of the funnel may result in the residue material (oil or the worse) into a water system.

What could be needed could be a hands-free articulated funnel holding apparatus that can properly hold the funnel in place in a wide variety of situations to allow an operator to apply both hands to maneuver a container's contents through the respective funnel interior wherein one situation further holds the funnel to drain into receiving instrumentality. In one possible version, the receiving instrumentality could be a disposal container apart from or a part of the funnel holding apparatus. Such a funnel holding apparatus should further be able to move between an open operating position and a compact storage state to allow for easy storage of the funnel holding apparatus.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to have hands-free holding of a funnel to an interior of material receiving device;

provide a hands-free loading of a material into a funnel;

the ability to have a hands-free draining of residue found in a used funnel;

provide a funnel cleaning means that avoids the use of cleaning solutions or wiping materials such as towels or rags;

the ability of multiple articulation of telescopic mast to properly locate and orient a funnel holding ring in a wide variety of orientations, telemetries and placements; and provide a funnel holding device with magnetic base weights to removably secure a funnel holding devices to a wide variety of surfaces having a wide variety of orientations and alternative to removably and magnetically hold the base to suitable surfaces.

These and other advantages may be realized by reference to the remaining portions of the specification, claims, and abstract.

BRIEF DESCRIPTION OF ONE EMBODIMENT OF THE PRESENT INVENTION

One possible embodiment of the invention could be an articulated funnel holder comprising a magnetic tray; a support arm that connects a pivoting device to the magnetic tray; a pivoting device having two pivoting arms movably connected at two respective pivoting arm ends to allow one pivoting arm to rotate about the other pivoting arm; a telescopic mast having two mast ends, the one mast end that attaches to the pivoting mechanism and a remaining mast end configured to removably and rotatably attaches to a funnel ring; the funnel ring configured to removably hold a funnel; wherein the articulated funnel holder moves between an open operative position and compact storage position; wherein articulated funnel holder in the compact storage position places the telescopic mast and the funnel ring within a storage area as defined by the edges of the magnetic tray.

Another possible embodiment of the invention could be an articulated funnel holder combination comprising: a magnetic tray; a J-shaped support arm forming a foot portion and a leg portion, the foot portion that connects to the magnetic tray, the leg portion connects to the pivoting device; a pivoting device having two pivoting arms movably connected at two respective pivoting arm ends to allow one pivoting arm to rotate about the other pivoting arm; a telescopic mast having two mast ends, the one mast end that attaches to the pivoting mechanism and a remaining mast end configured to removably accept to a funnel ring; the funnel ring removably attached to the remaining mast end; a funnel as removably received and supported by the funnel ring; wherein the funnel ring rotational orientation to the telescopic mast and telescopic mast length and rotational orientation to the support arm are adjusted to direct a material moved through the funnel to a receiving instrumentality.

Yet another possible embodiment of the invention could be A method of operating a funnel holder comprising of the following steps providing an articulated funnel holder comprising a magnetic tray, a support arm that connects a pivoting device to the magnetic tray, a pivoting device having two pivoting arms movably connected at two respective pivoting arm ends to allow one pivoting arm to rotate about the other pivoting arm, a telescopic mast having two mast ends, the one mast end that attaches to the pivoting device and a remaining mast end configured to removably and rotatably attaches to a funnel ring; the funnel ring configured to removably hold a funnel; providing a funnel; engaging the magnetic tray with a surface of a support object; rotating the telescopic mast from away from the support arm; extending the telescopic mast; removably attaching a funnel ring to the telescopic mast; supporting the funnel with the funnel ring; and adjusting funnel ring, telescopic mast and pivoting device to orientate the funnel to direct material as received by the funnel to a receiving instrumentality.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
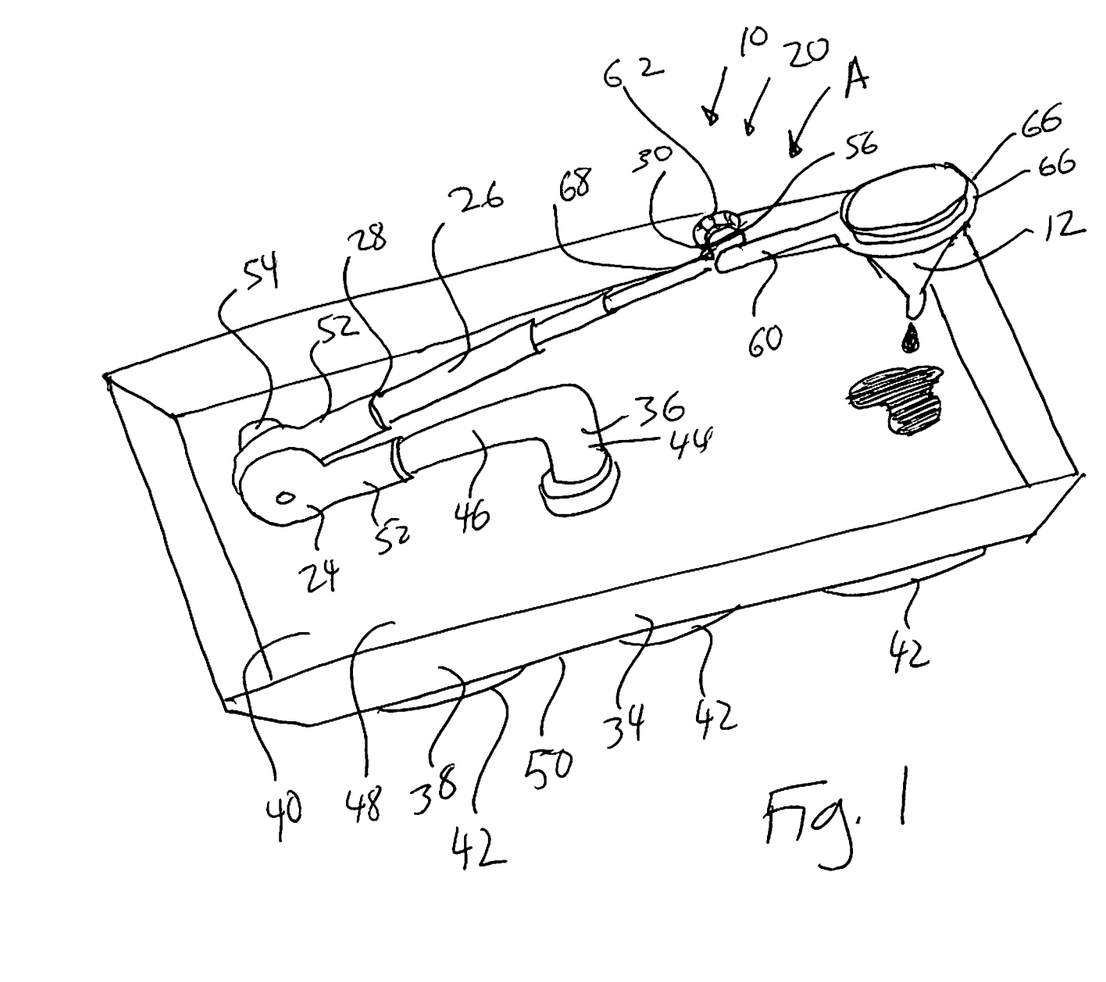
FIG. 1 is substantially a perspective top view of one embodiment of the funnel holder of the present invention in an open operating position.
Figure 2:
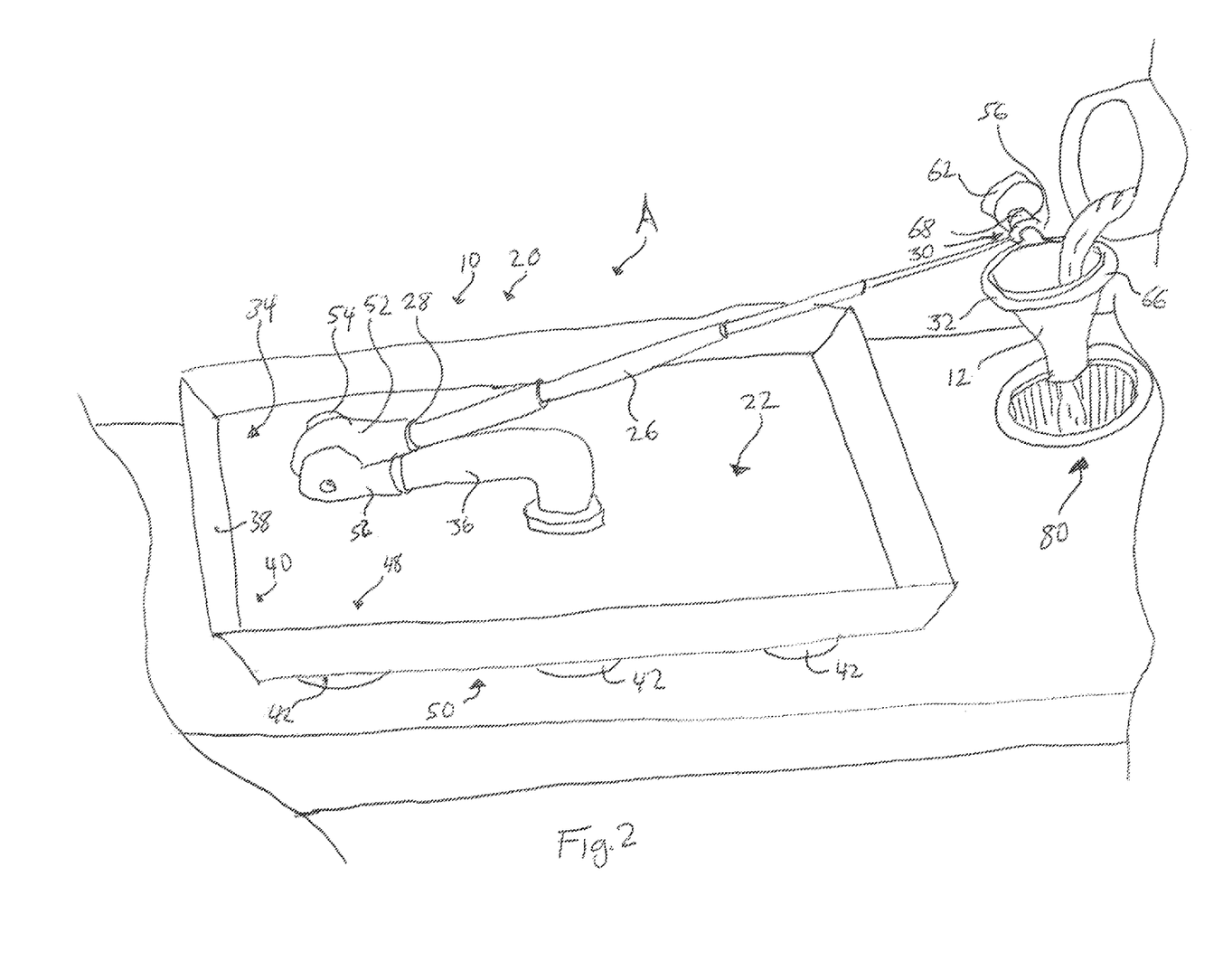
FIG. 2 is substantially a perspective view of one embodiment of the of the funnel holder of the present invention in another open operating position.
Figure 4:
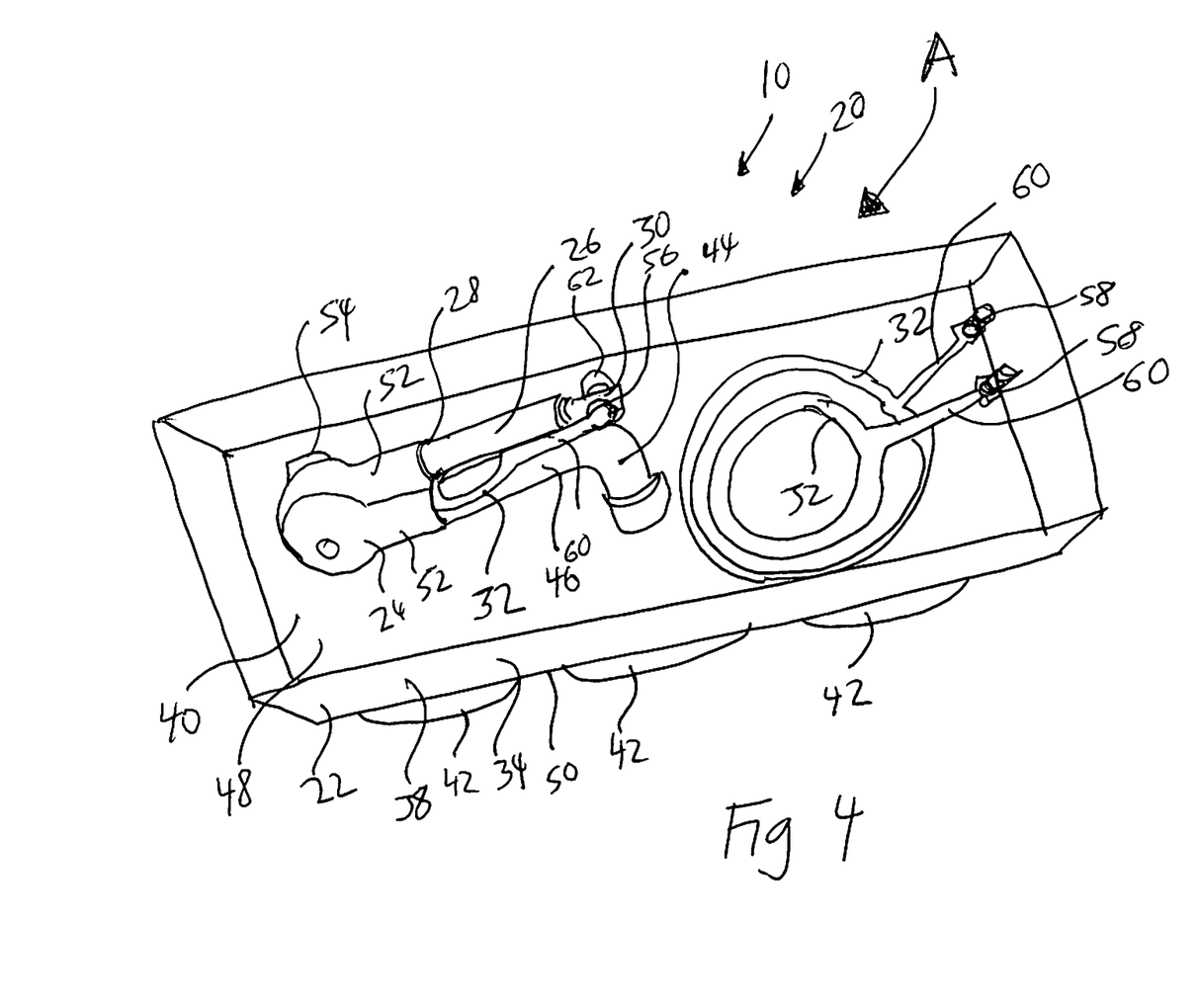
FIG. 4 is substantially a perspective top view of one embodiment of the funnel holder of the present invention in a compact storage position.

The present invention 10 may comprise an articulated funnel holder 20 and a method or process 100 for same. As substantially shown in figure(s) 1, 2, and 4, the funnel holder 20 could comprise a base 22 that supports a pivoting device 24, the pivoting device 24 that further pivotally connects to a telescopic mast 26 at one mast end 28, the telescopic mast 26 at another mast end 30 pivotally and removably attaches to a funnel holding ring 32. Funnel holder 20 provides an articulation that allows a placement of the funnel ring 32 (which may removably hold and support a funnel 12) in a wide variety of positions, orientations and telemetries from the base 22. The base 22 could be rectangularly-shaped tray 34 with a support arm 36. The tray 34 could be formed by an outwardly angled wall 38 that continuously surrounds edges of a rectangular plate 40 to substantially provide the base 22 with a basin quality for catching and retaining residue from a used funnel 12 that may be removably held over the tray 34 by a remainder of the funnel holder 20. One or more plate weight/magnets 42 that could be permanently attached to the tray underside or bottom 50 that could allow the base 22 itself to removably and magnetically attached to surface of receiving instrumentality 80 (e.g., steel parts of a motor) as well as anchor the base 22 when attached instead to surface that lacks magnetic attraction or attachment qualities.

The tray's support arm 36 could be a J-shaped hollow metal tube wherein the tip of the J foot portion 44 of the support arm 36 could be attached (e.g., welded) in the middle of the rectangular plate top 48 so as to substantially hold the J leg portion 46 in a spaced-apart and parallel orientation to the plate top 48. The J Leg portion orientation could follow the tray's lengthwise centerline but keeping the J leg portion 46 within an area as substantially defined by the continuous tray wall 38. The J shape of the support arm 36 could allow the telescopic mast 26 to be placed in a compact state and be well located within the tray itself. At the same time, in the extended state, the telescopic mast could transfer loads created by the attached funnel rings 32, funnels and like to the support arm anchored in the center of the tray. This combination could make articulated funnel holder operations more stable and reduce the likelihood that the articulated funnel holder 20 would fall over during use.

The pivoting device 24 could pivotally connect the support arm 36 to the telescopic mast 26 so that the pivoting location for the telescopic mast 26 could be pivotally anchored off-set from the tray's center. The pivoting device 24 could comprise two pivoting arms 52 that may be pivotally connected together at two respective arm ends allowing the other remaining arms ends to rotate about each other like clock arms moving between a spaced-apart parallel position to various non-parallel positions. Generally, the physical restrictions set forth by the tray wall 38 could limit such pivoting arm/telescopic mast rotational placement of the telescopic mast 26 relative to the base 22 to form an obtuse angle (e.g., providing telescopic mast rotational movement between 0° to 160°). The pivoting device 24 could further employ a spring-loaded ratchet (not shown), a release knob 54, or like mechanism to allow the movement of the pivoting arms 52 to a desired position and be removably held at that desired position until later released and moved to another desired position.

The telescopic mast 26 could comprise movably connected telescoping sections, all of which could rotate relative to each other about the lengthwise or longitudinal telescopic mast centerline. The telescopic mast 26 could further terminate at a pair of mast ends with one mast end 28 possibly fixedly attached to one pivoting arm 52 (e.g., the pivoting arm that is not attached to support arm 36.) The remaining mast end 30 could be adapted to removably connect to the funnel ring 32. In one embodiment, the remaining mast end 30 could be flattened and be penetrated by the funnel aperture 56. The funnel aperture 56, which could be oriented by rotation of one or more telescopic sections, could removably receive a threaded post 58 of funnel ring tab 60 to which a funnel ring knob 62 with an open ended threaded channel 64 could removably receive the threaded post 58 to removably secure the funnel ring 32 to the remaining mast end 30. The offset position of telescopic mast 26 relative to the tray 34 could allow the telescopic mast 26 when generally placed in a substantially upright position to the tray 34 could place a funnel ring 32, as when holding a funnel 12, over the tray 34 so that any residue found in the funnel 12 after using the funnel 12 could drip down into and be contained by the tray 34.

Figure 3:
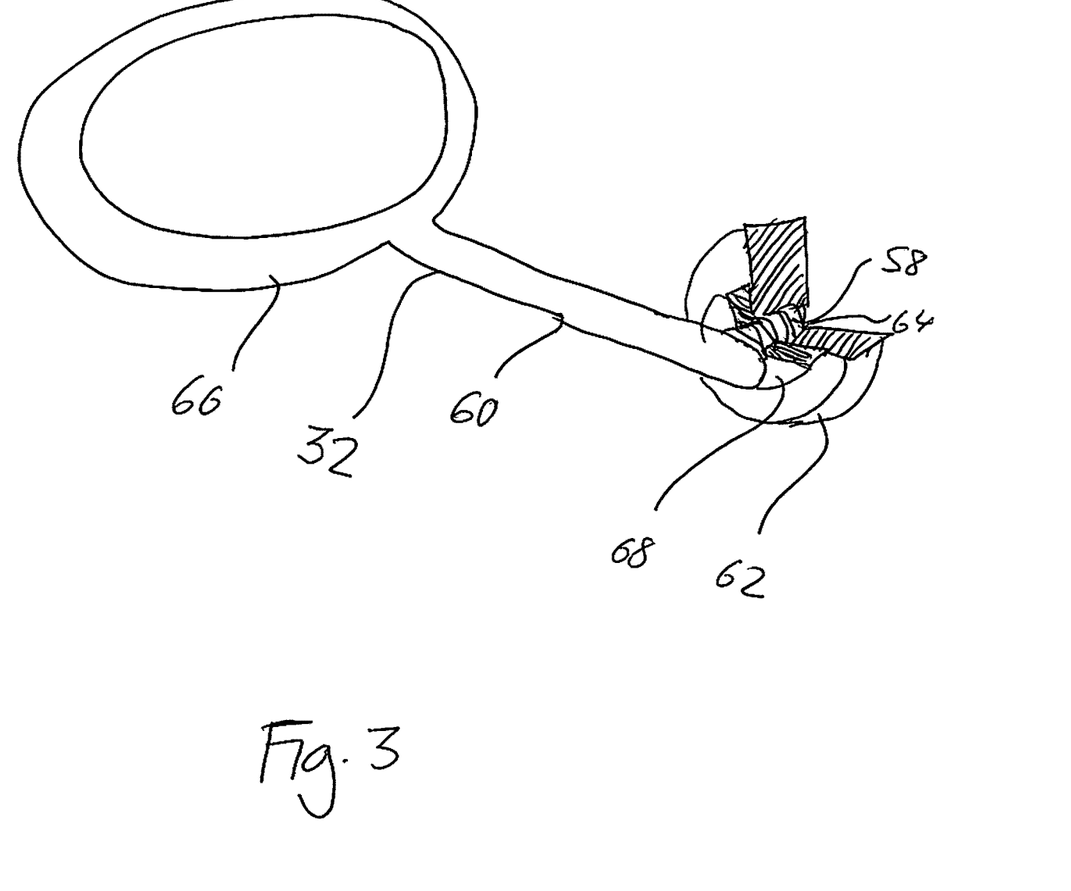
FIG. 3 is substantially a top perspective cutaway view of one embodiment of the funnel ring of the present invention.

As substantially shown in FIG. 3, the funnel ring 32 could be a metal ring 66 with a funnel ring tab 60 extending outward from the funnel ring 32. The unattached end of the support tab, if a rod structure like the metal ring 66, could be flattened and perpendicularly support a threaded post 58 (e.g., a welded on bolt or like.) The invention 10 could include a set of funnel rings 32 with each funnel ring 32 having ring circumference different form the ring circumferences from the other funnel rings 32 in the funnel ring set, the circumference of each funnel ring 32 could handle different size range of funnels 12.

The funnel ring 32 could be removably attached to the remaining telescopic mast end 30 by inserting the threaded post 58 through the funnel aperture 56 and then to receive a washer or two 68. The threaded post 58 could then be received within the open-ended threaded channel 64 of the funnel ring knob 62 to hold the support tab 60, washers 68 against the remaining mast end 30. The funnel ring 32 could be rotated about the remaining mast end 30 until the desired funnel ring position relative to the remaining mast end 30 could be achieved. The funnel ring knob could then be tighten down upon the threaded post 58 to compress against the washer(s) 68, the remaining mast end 30 and funnel ring support tab 60 to removably secure the funnel ring 32 in a desired rotation position relative to the telescopic mast 26.

In this manner, the invention 10 could be placed in compact storage position A wherein the funnel ring 32 is not attached to the remaining mast end 30 and the telescopic mast is compacted and lower into a parallel, yet spaced-apart, position to the remaining portion of the J-leg portion 46 of the support arm 36. A set of funnel rings 32 could be magnetically held within the tray 34 as well as being partially held between the compacted telescopic mast 26 and a portion of the support arm 36. The telescopic mast 26 and funnel rings 32 could be positioned as to be generally found within area substantially denoted by the continuous tray wall 38. This telescopic mast/rings position could allow the invention 10 to be placed in a tool chest storage drawer or the like (not shown). In some conditions, the compacted invention 10 could be placed on the outside wall of a tool chest or cabinet (not shown.)

The invention 10 could be brought out of the compact storage position A and be moved into the open operating position B by removing the set of funnel rings 32 from the tray 34. In certain situations one funnel ring remains attached to the telescopic mast in the compact storage position but is pivoted over relative to the telescopic mast 26 to be on top of the mast or to be sandwiched between the telescopic mast 26 and support arm.

The tray 34 could then be placed upon a desired surface. If the surface is for an object (e.g., ICE valve cover) is made of magnet attracting metal, then tray 34, though its magnetic properties, could be placed on the side or underside of an object to removably anchor the tray 34 in the desired location and orientation. The pivot arm/telescopic mast combination could be bought out of spaced apart and parallel alignment with the J-leg portion 46 of the support arm 36 to desired non-parallel operating position. The telescopic mast 26 could be extended to a desired length. The sections could be rotated as desired to bring the remaining mast end 30 into proper orientation for funnel ring attachment. The desired circumference funnel ring 32 could be selected to accommodate and hold the selected funnel 12. The selected funnel ring 12 could be attached to remaining mast end 30 and be brought a desired rotational position relative to the telescopic mast 26 before being tightened down in place by the funnel ring knob 62. In this manner, the funnel ring 32 and hence the funnel 12 could be located over the tray 34 to drain the residual material from a used funnel 12 into the tray 34 or over a waste collection container or like (not shown). The funnel ring 32 could also be positioned to place the funnel's delivery open end within the opening of the receiving instrumentality so as to deliver container contents that are being directed by the funnel 12 into the interior of the receiving instrumentality 80.

Figure 5:
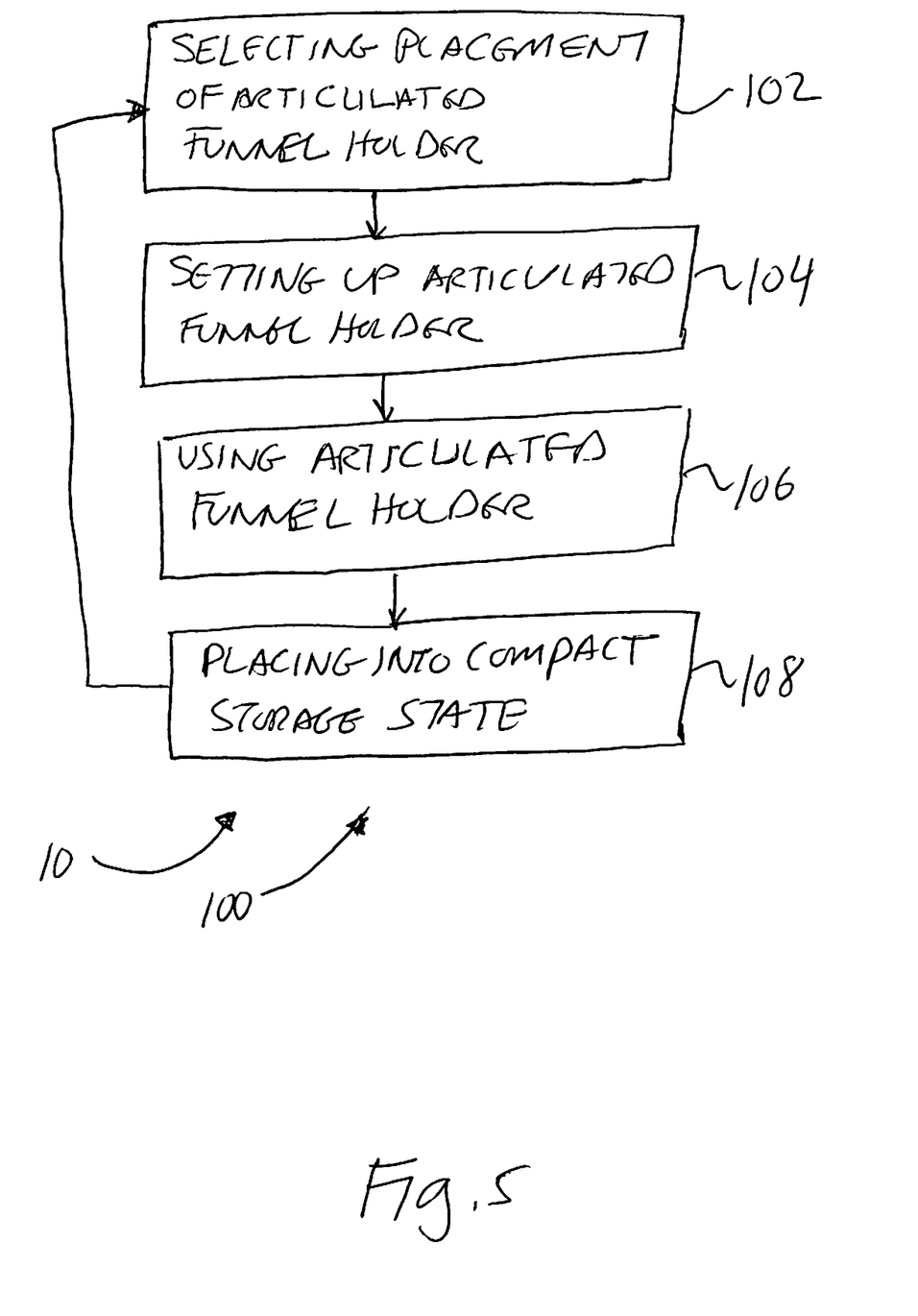
FIG. 5 is substantially a flowchart schematic showing one possible embodiment of a process or method for operating the present invention.

As substantially shown in FIG. 5, one possible embodiment method or process 100 for operating the invention could start step 102, selecting placement of the articulated funnel holder. In this step, the operator could determine which funnel is to be used, how to use the funnel (e.g., delivering contents of a container or draining off of residual material found in the funnel interior) and what should be the funnel's position, orientation and telemetry. The object and the particular object surface to which the tray is be located could also be selected. The operator could further determine if the object surface could be attracted to the magnetic portion of the tray. The funnel holder could be removed from its storage location and the funnel ring set could be removed from the tray. As this step is substantially completed, the method 100 could proceed to step 104, setting up the articulated funnel holder.

In step 104, setting up the articulated funnel holder, the operator could place the tray upon the surface of object which is to support the funnel holder. In one possible embodiment, such as directing motor oil to the interior of internal combustion engine valve covering opening (ultimately placing the motor oil into a oil pan of the motor) the operator could first remove the valve covering cap and place the cap aside. The operator could the place the tray upon the object surface, which in this embodiment could be the surface of the valve cover. In the present instance, the valve cover could belong to an engine having V oriented piston cylinders such as a V-8 or V-6 motor for an ICE automotive car), the valve covers for such a motor could be laterally slanted to accommodate such a V orientation. Generally, such valve covers are made of steel to which magnets can be removably attach allowing the tray once placed upon the slanted valve cover to stay in place until moved later by the operator. The operator could activate the pivot device's push button or turn knob to allow pivoting of the pivot arm/telescopic mast combination up and away from the support arm. Once the combination is pivoted to desired location, the push button of turn knob could be de activated to hold the combination in place relative to the support arm and tray. At that time, the telescopic mast could be extended to the desired length and the remaining mast end could be rotated relative to the remaining sections of the telescopic mast as needed to orient the funnel aperture. The operator could insert the threaded section of the funnel ring tab through the aperture and the through one or more washers before attaching the knob. Once the rotational orientation of the telescopic ring to the telescopic mast is set, the knob could tightened down upon the threaded portion to secure the funnel ring in place. Once this step is substantially completed, the process could proceed to step 106, using the articulated funnel holder.

In step 106, using the articulated funnel holder, the operator could place the funnel into the funnel ring and generally ensure that the funnel is pointed in the right direction (e.g., into opening of receptacle such as valve cover cap opening; towards the tray plate to catch residue material from the funnel, and the like.) At that time, the articulated funnel holder will hold the funnel in place hands-free. The container holding the material to be poured into the funnel can be unsealed (opening the quart container of suitable motor oil) and using both hands of the operator, the container opening can be brought to the lip of the larger circumference receiving open funnel end and the contents can be moved in a controlled manner into and though the funnel. The container contents (e.g., motor oil) accordingly can be deposited by the smaller circumference transmitting open funnel end into the desired receiving container.

The articulated funnel holder could be used to drain off the residual material left in the funnel interior after use of the funnel. In this version, the articulated funnel holder could be set-up to direct or aim the smaller circumference transmitting open funnel end towards a first receiving instrumentality 80 placed upon the tray or just the tray by itself without such a first receiving container. In another embodiment, the smaller circumference transmitting open funnel end could be directed to a second and different receiving instrumentalities 10 such as a waste container (such as that used to receive waste oil from an automotive motor oil change.) Once this step is substantially completed, the process 100 can substantially proceed to step 108, placing into compact, storage state.

In step 108, placing into compact, storage state, the funnel can be removed from the funnel ring. The knob attaching the funnel ring to the telescopic mast could be untightened and removed from the threaded portion of the funnel ring tab. The funnel ring could be removed along with the washer(s) from the remaining mast end. The washer(s) could be placed back upon the threaded portion with the knob being tightened down on the threaded portion to hold the washer(s) in place upon the funnel ring. In another version, the funnel ring is left attached to the telescopic mast and then rotated against the telescopic mast. The telescopic mast can be compacted. The push button/tightening knob could be deactivated to release the pivot arm/telescopic mast combination from its operative position. Upon bringing the combination into its storage compact position that is apart but parallel to the support arm, the push button/tightening knob could be again activated to hold the combination in place in the storage compact position. The set of funnel rings can be placed in the tray, a portion of the funnel rings placed underneath the combination while another portion of the set of funnel rings can come into contact with the plate whereby the attraction of the magnet weights may help reversibly hold funnel ring set in place upon the tray. The funnel holder and funnel may then be returned to their suitable storage area. At the substantial completion of this step, the process 100 may return to step 102, selecting placement of the funnel holder.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. An articulated funnel holder comprising:
    (A) a magnetic tray;
    (B) a support arm that connects a pivoting device to the magnetic tray;
    (C) the pivoting device having two pivoting arms movably connected at two respective pivoting arm ends to allow one pivoting arm to rotate about the other pivoting arm;
    (D) a telescopic mast having two mast ends, the one mast end attaches to the pivoting device and a remaining mast end removably and rotatably attaches to a funnel ring;
    (E) the funnel ring configured to removably hold a funnel;
    wherein the articulated funnel holder moves between an open operative position and compact storage position; wherein the articulated funnel holder in the compact storage position places the telescopic mast and the funnel ring within a storage area as defined by the edges of the magnetic tray; wherein the funnel ring comprises a metal ring with an outwardly projecting support tab, the support tab perpendicularly supports a threaded post that is configured to pass through a funnel aperture as defined by the remaining mast end to removably engage a funnel ring knob in a manner that removably and adjustably attaches the funnel ring to the remaining mast end.

2. The articulated funnel holder of claim 1 wherein the magnetic tray comprises a continuous outward angled wall surrounding the edges of a plate to form a basin, the basin configured to receive and retain a residue material from a used funnel as held by the funnel ring.

3. The articulated funnel holder of claim 1 wherein one pivoting arm pivots about the other pivoting arm to provide a telescopic mast rotational movement relative to the base between 0° to 160°.

4. The articulated funnel holder of claim 1 wherein the support arm is J-shaped with a foot portion and leg portion, an end of the foot portion attaches to the magnetic tray while an end of the leg portion is attached to one end of the pivot arm.

5. The articulated funnel holder of claim 4 wherein the articulated funnel holder in the compact storage position further has the telescopic mast in a contracted state and held parallel over and spaced apart from the leg portion.

6. The articulated funnel holder of claim 5 wherein the articulated funnel holder in the compact storage position further has the funnel ring rotated to be located between the telescopic mast and the support arm.

7. The articulated funnel holder of claim 1 wherein when the articulated funnel holder is in the compact storage position one or more magnets of the magnetic tray removably hold a funnel ring in contact with the magnetic tray.

8. The articulated funnel holder of claim 1 wherein the support arm locates the pivot device off center relative to the magnetic tray.

9. The articulated funnel holder of claim 1 wherein the funnel ring is one funnel ring selected from a set of funnel rings removably held within the magnetic tray, each funnel ring having a ring circumference that is different from ring circumferences of other remaining funnel rings of the set of funnel rings.

10. An articulated funnel holder combination comprising:
(A) a magnetic tray;
(B) a J-shaped support arm comprises a foot portion and a leg portion, the foot portion connects to the magnetic tray while the leg portion connects to a pivoting device;
(C) the pivoting device having two pivoting arms movably connected at two respective pivoting arm ends to allow one pivoting arm to rotate about the other pivoting arm that connects to the J-shaped support arm;
(D) a telescopic mast having two mast ends, the one mast end attaches to the one pivoting arm while a remaining mast end is configured to removably accept a funnel ring;
(E) the funnel ring removably attaches to the remaining mast end;
(F) a funnel removably attaches to the funnel ring;
wherein the funnel ring rotational orientation to the telescopic mast and telescopic mast length and rotational orientation to the support arm sets the position and placement of the funnel to deliver material to a receiving instrumentality from a set of receiving instrumentalities consisting of an internal combustion engine, a waste container, a basin as formed by the magnetic tray; wherein the telescopic mast further comprises telescopic sections, one or more telescopic sections rotate about a telescopic mast centerline to orient a remaining mast end funnel aperture through which the funnel ring is removably connected.

11. A method of operating a funnel holder comprising the following steps,
(A) providing an articulated funnel holder comprising a magnetic tray, a support arm that connects a pivoting device to the magnetic tray, a pivoting device having two pivoting arms movably connect at two respective pivoting arm ends to allow one pivoting arm to rotate about the other pivoting arm connected to the support arm, a telescopic mast having two mast ends, a one mast end that attaches to the one pivoting arm and a remaining mast end configured to removably and rotatably attach to a funnel ring; the funnel ring configured to removably hold a funnel, wherein the funnel ring rotational orientation to the telescopic mast and telescopic mast length and rotational orientation to the support arm adjusts to direct a material through the funnel to a receiving instrumentality from a set of receiving instrumentalities consisting of an internal combustion engine, a waste container, a basin as formed by the magnetic tray;
(B) providing a funnel;
(C) engaging the magnetic tray with a surface of a support object;
(D) rotating the telescopic mast away from the support arm thereby releasing the funnel ring from being sandwiched between the telescopic mast and support arm;
(E) extending the telescopic mast;
(F) removably attaching the funnel ring to the telescopic mast;
(G) supporting the funnel with the funnel ring; and
(H) adjusting funnel ring rotational orientation relative to the telescopic mast and telescopic mast length and rotational orientation relative to the support arm to orientate the funnel to direct material passing through the funnel onto the receiving instrumentality.

12. The method of claim 11 further comprising a step of readjusting funnel ring rotational orientation to the telescopic mast and telescopic mast length and rotational orientation to the support arm to orientate the funnel to direct a residual material on the funnel interior to a basin as formed by the magnetic tray.

13. The method of claim 11 wherein the extending the telescopic mast further comprises a step of rotating one or more telescopic sections of the telescopic mast around a common telescopic mast centerline.

14. The method of claim 11 wherein the rotating the telescopic mast away from the support arm further comprises a step of moving the funnel ring fem-away from contact with the support arm.

* * * * *